Nov. 8, 1932.  E. L. HALLBERG ET AL  1,887,017
SPREADER FOR FERTILIZERS, SEEDS, AND THE LIKE
Filed Sept. 19, 1930  2 Sheets-Sheet 1
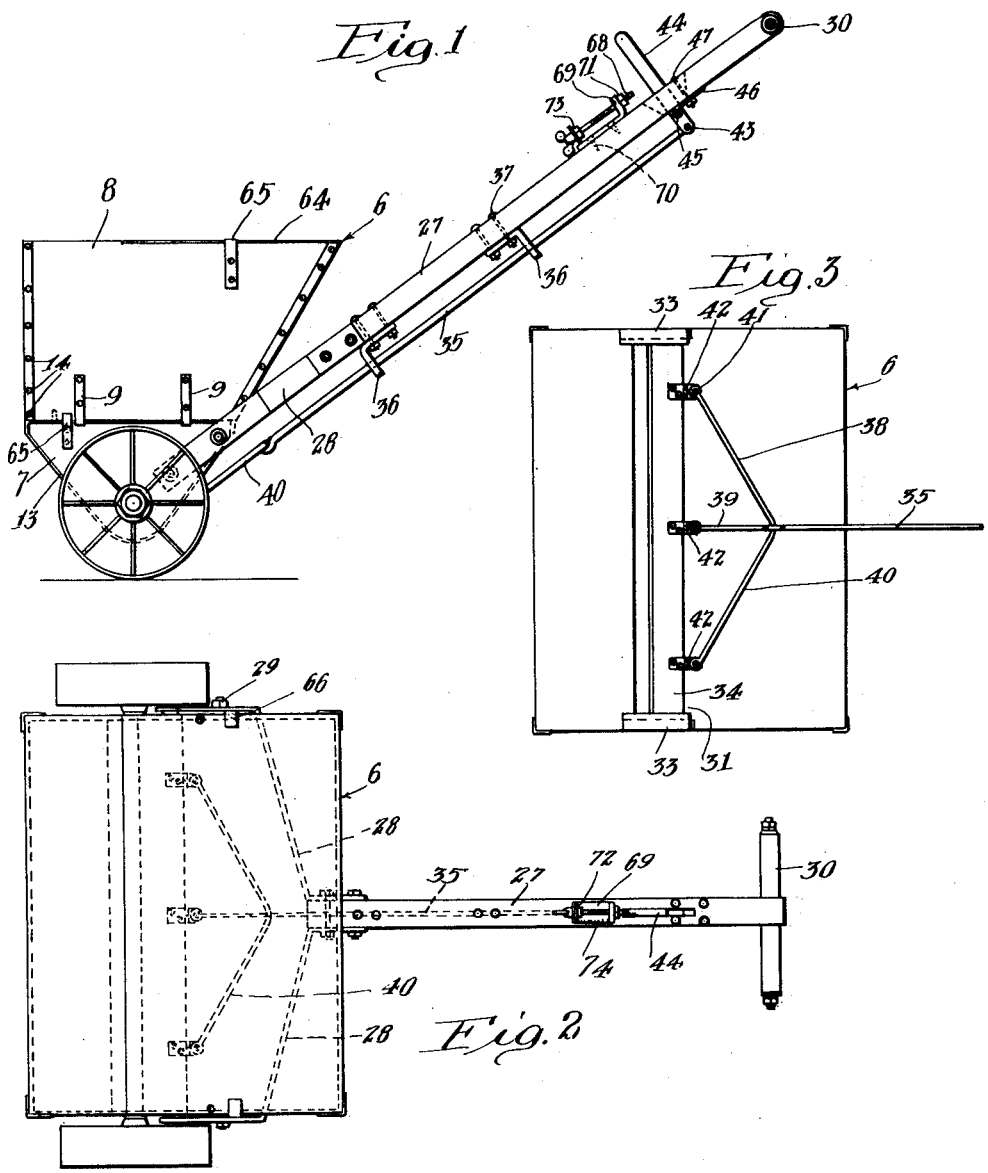

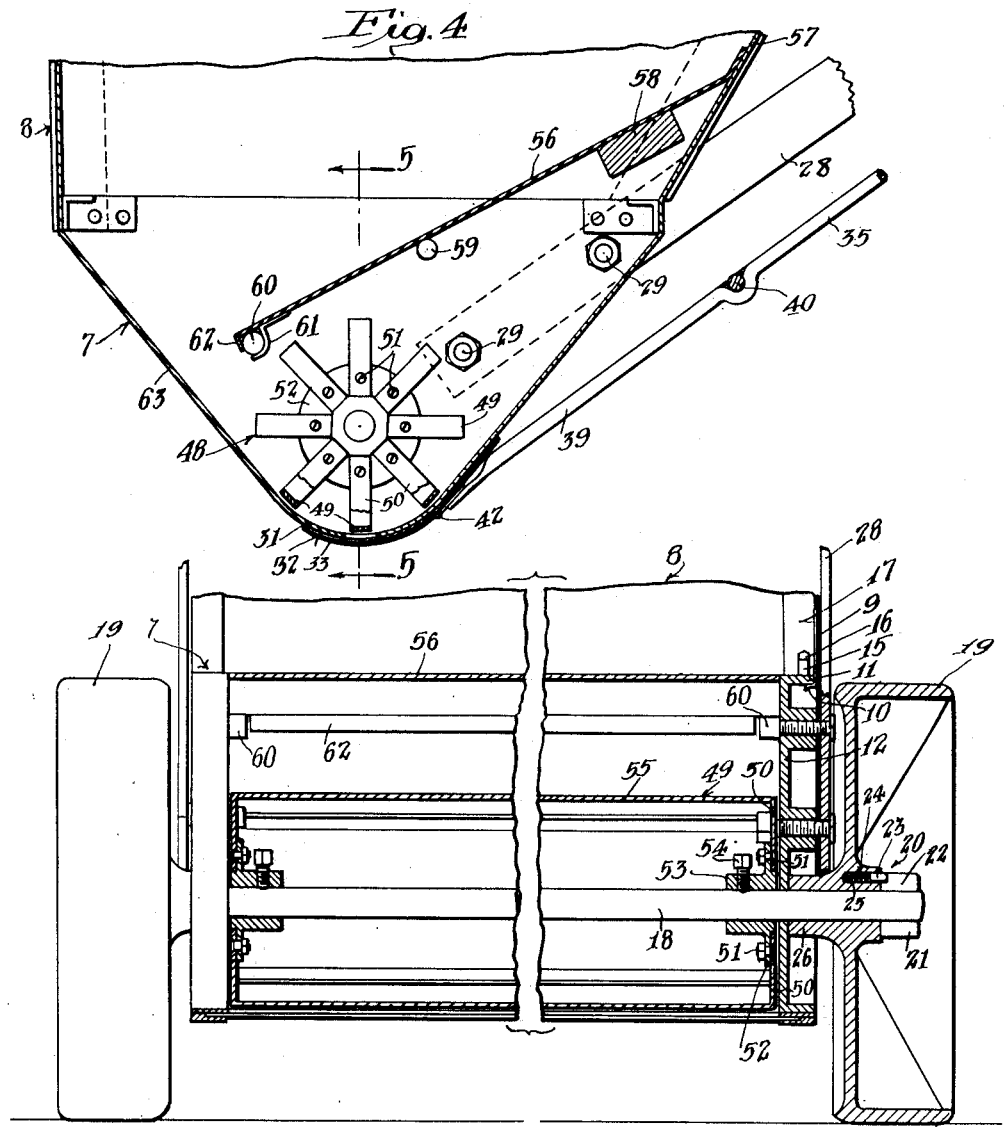

Patented Nov. 8, 1932

1,887,017

UNITED STATES PATENT OFFICE

ERNEST L. HALLBERG AND HERL J. RYAN, OF PALMS STATION, CALIFORNIA

SPREADER FOR FERTILIZERS, SEEDS, AND THE LIKE

Application filed September 19, 1930. Serial No. 482,920.

This invention relates to spreaders for fertilizers, seeds and the like, and, in general, an object of the invention is the general improvement of this class of implements.

A very important object is uniformity or evenness in the spreading of fertilizers and seeds.

Implements of this type are employed at present to a large extent for seeding and reconditioning golf greens. Implements of the types previously employed in spreading fertilizers and seeding golf greens did not spread the fertilizers and seeds evenly, the fertilizers, particularly, being deposited thicker in some places than others and, consequently, requiring a great amount of hand labor in spreading the fertilizer after the implement had deposited it upon the green. Obviously, this was an expensive procedure, besides resulting in a poorly conditioned green, as spreading the fertilizer with a brush or other hand operated tool will not produce the uniform spreading that is accomplished by the use of this newly invented implement.

Another object is simplicity of construction.

Another object is ability to effectively control the volume of material being discharged by the implement.

Other objects and advantages will appear in the subjoined detailed description.

The accompanying drawings illustrate the invention:

Figure 1 is a side elevation of a spreader for fertilizer and seeds, constructed in accordance with the provisions of this invention, the implement being positioned as it appears when in use.

Figure 2 is a plan view of Fig. 1.

Figure 3 is an inverted plan view of Fig. 1, omitting the running gear and the tongue.

Figure 4 is an enlarged fragmental side view with one of the hopper heads omitted, and some of the parts shown in section.

Figure 5 is a broken vertical section mainly on the line indicated by 5—5, Fig. 4.

Referring to the drawings, there is provided a hopper, indicated in general by the character 6, and comprising, in this instance, a lower section 7 and an upper section 8 which is detachably mounted on the section 7 so as to increase the depth of the hopper as is desirable when the implement is to be employed for the spreading of fertilizer.

When seeds are to be spread by the implement, the hopper section 8 may be readily removed as it is held in place by spring clips or straps 9 that are secured to the hopper section 8 and that have inturned angular ends 10 that engage beneath the shoulders 11 of the hopper section 7. In this instance, the shoulders 11 are formed on heads 12 that constitute the opposite ends of the hopper section 7. The heads 12, for example, may be in the form of castings and the trough-shaped portion 13 of the hopper section 7 may be constructed of sheet metal and secured by screws 14 to the heads 12.

In order to prevent relative lateral movement between the hopper sections 7, 8, studs 15 project upwardly from the heads 12 into sockets 16 in the lower ends of side walls 17 of the hopper section 8, which side walls rest upon the upper faces of the heads 12.

The hopper is mounted on a running gear which comprises an axle 18, wheels 19 and pawl and ratchet means 20 that connect the axle 18 to the wheels 19 for driving the axle when the wheels turn in one direction. Each of the pawl and ratchet means includes a ratchet member 21 fixed by a key 22 to the axle 18, a pawl 23 mounted in a socket 24 in the wheel 19, and a spring 25 in the socket 24 urging the pawl into engagement with the ratchet member 21. The teeth of the ratchet members 21 may be constructed for example, to turn the axle 18 when the implement is pushed to the left in Fig. 1. The axle 18 is mounted to turn in bearings 26 provided in the heads 12.

The hopper is pushed and pulled by a tongue 27 which is connected by a forked portion 28 and bolts 29 to the outer faces of the heads 12. The free end of the tongue 27 is provided with a transversely extending handle 30 to facilitate handling the implement by the operator.

As clearly shown in Fig. 4, the concave bottom 31 of the hopper is provided with a transversely extending opening or slot 32 through which material discharges from the hopper onto the surface beneath on which the material is being spread. A suitable means is provided for closing the slot 32 to any desired degree so that the volume of discharge of the material may be accurately regulated and this means will now be described.

The bottom 31 of the hopper is provided at opposite ends of the slot 32 with guides 33 for the opposite ends of a sliding closure 34 which is curved to fit the curved bottom 31. This closure 34 is adjusted into different positions, for regulating the discharge of material through the slot 32, by any suitable mechanism which, in this instance, is constructed as follows: A rod 35 works in guides 36 which are secured at 37 by bolts or the like to the tongue 27. The rod 35 is branched, as shown at 38, 39 and 40 and each of the branches is secured at 41 to one of the leaves of a hinge 42, the other leaf of said hinge being secured to the closure 34. When the rod 35 is operated, the hinge 42 permits of the requisite movement of the closure 34 in an arc without bending the branches 38, 39 and 40, of the rod. The upper end of the rod 35 is pivoted at 43 to an operating lever 44 which is pivoted at 45 to a member 46 which is secured by a bolt 47 or other suitable fastening device to the tongue 27. It is to be understood that the friction of the closure 34 in the guides 33 and the friction of the rod 35 in the guides 36, and of the pivotal connection 45 of the lever 44, hold the closure in whatever position it is adjusted to, whether it be entirely closed, fully opened, or partially opened. By manipulating the lever 44, the operator may readily regulate the volume of material discharging from the hopper through the slot 32.

A very important feature of the invention is the agitator which is indicated, in general, by the character 48. This agitator is constructed so that, when rotating, it does not force material from the hopper through the slot 32, but said agitator simply stirs up the material in the hopper and prevents packing of the material so that the discharge of the material through the slot 32 is caused principally by gravity.

The agitator 48, in this instance, is constructed as follows: A number of U-shaped members 49 have their angular ends 50 screwed or otherwise secured, at 51, to flanges 52, provided with hubs 53 that are secured by set screws 54, or their equivalents, to the axle 18, thereby entailing rotation of the arms 49. Each of the arms 49 is constructed of flat bars, preferably metal, so that the straight intermediate portion 55 of the arm 49 is positioned so that its width lies at right angles to a radial plane of the agitator. Thus, when the agitator is turning, the intermediate portion 55 of the members 49 progress edgewise through the material in the hopper so as to continually loosen up that portion of the material that is at the bottom of the hopper adjacent to the slot 32. The tendency for the agitator to impel material toward and through the slot 32 is very slight and, accordingly, the material will discharge through the slot mainly by the effect of gravity thereon.

Preferably, the hopper section 8 is provided with an inclined baffle member 56 which loosely rests on the inner face of the sloping wall 57 of the section 8 and extends aslant downwardly therefrom. A cross member 58 within the hopper section 8 aids in supporting the baffle member 56. The baffle member 56 also projects downwardly into the hopper section 7, over the agitator 48, and said baffle member 56 is supported in the hopper section 7 by studs 59, 60 that project inwardly from the heads 12. The baffle member 56 simply rests on the upper studs 59 and the lower end of the baffle member 56 rests on the studs 60 and said lower end is provided with an angular downwardly projecting clip 61 that projects beneath the studs 60 so as to prevent movement of the lower end of the baffle member 56 upwardly from the studs 60, thus preventing vibration of the baffle member 56. Preferably, the baffle member 56 is provided at its lower end with a down-turned flange 62 which simply functions to stiffen the lower end of the baffle member, which lower end is spaced a short distance from the wall 63 of the hopper section 7 so that material in the hopper above the baffle member 56 can pass the lower end of the baffle member and thus come into proximity to the agitator. The upper hopper section and baffle member 56 are only preferably employed when fertilizer is being spread.

When the implement is being used for the purpose of spreading seed, the upper hopper section 8 may be taken off and the baffle member 56 will come off with it. It will be seen that the clips 61 and stud 60 serve to detachably connect the baffle member 56 with the lower section 7.

If desired, the hopper may be provided with a cover 64 which may be held in place on the hopper section 8 by spring clips 65 which are secured to the opposite side walls of the hopper section 8 and have their angular ends 66 extending over the upper face of the cover 64. In this instance, the length of the cover 64 is less than the length of the top of the hopper section 8, and, preferably, said cover 64 is of the same length as the top of the hopper section 7 so that when the upper hopper section is removed from the lower hopper section, the cover 64 may be displaced from the upper hopper section and placed on the lower hopper section. Additional spring clips 67 on the sides of the lower hopper section 7, similar to the spring clips 65, may be employed for holding the cover 64 in place on the lower hopper section.

When using the implement, it will sometimes be necessary to wheel it over areas already treated and at such times the operator will manipulate the lever 44 into position to entirely close the slot 32. However, since it may be desirable to have the material discharge at the same rate over the different areas, unless proper adjustment of the closure 34 has been secured there is preferably provided a suitable stop 68 for engagement by the lever 44 when said lever is moved into position to open the closure 34. The stop 68 is adjusted so as to provide for whatever degree of opening of the closure 34 is desired when the lever 44 is in contact with said stop. In this instance, the stop 68 is in the form of a thumb-screw which is threaded into a bracket 69 secured by screws 70, or their equivalent, to the tongue 27. The thumb-screw is provided with a jamb-nut 71, adapted to be tightened against the bracket. The thumb-screw may be provided with a pointer 72 held in place by a nut 73 and said pointer cooperates with a scale 74 marked on the upper face of the bracket 69 so as to indicate the degree of opening of the closure 34.

The foregoing will make clear the construction and operation of the invention, and, in brief, the operation is as follows: The closure 34 will be closed and the material that is to be distributed will be placed in the hopper and the implement will be wheeled to the place where the spreading of the material is to begin. The operator will manipulate the lever 44 and the stop 68 so as to adjust the closure 34 in position to discharge the material at the desired rate or, in other words, spread the desired amount of material over a unit area. Having made this adjustment, the operator will wheel the implement over the entire area that is to be treated, closing the closure 34 whenever it becomes necessary to traverse areas that have been already treated, or are not to be treated. Ordinarily, in retracing areas that have been treated, it will not be necessary to close the closure 34 as the retracing may be done by moving the implement in a reverse direction without turning it around, thereby causing the pawl and ratchet devices to function in a manner to maintain the agitator stationary.

This spreader is useful for spreading seed, fertilizers, top dressings and any other materials used in connection with the making and upkeep of lawns, golf greens and the like.

We claim:

1. A spreader of the character described comprising a hopper provided with a single discharge slot of width sufficient to permit material in said hopper to fall freely therethrough by gravity extending from side to side in its bottom, wheels to carry the hopper, an agitator having approximately flat members arranged in a circle above the slot, said flat members positioned to rotate edgewise through the material in the hopper, and means operably connecting the wheels with the agitator, said flat members being positioned to move past said slot closely adjacent to said slot whereby they partially close said slot to restrict the flow of material therethrough.

2. A spreader of the character described comprising a hopper provided with a concave bottom and with a slot extending from side to side in its bottom, wheels to carry the hopper, a tongue connected with the hopper, guides secured to the end faces of the hopper bottom at the ends of the slot, a curved closure fitting the hopper bottom and having its ends shiftably supported by the guides, an operating member movably supported by the tongue, a stop adjustably mounted on the tongue for engagement by the operating member, means operably connecting the operating member with the closure, an agitator in the hopper, and a means operably connecting the wheels with the agitator.

3. A spreader of the character described comprising a hopper provided with a concave bottom and with a slot extending from side to side in its bottom, wheels to carry the hopper, a tongue connected with the hopper, guides secured to the end faces of the hopper bottom at the ends of the slot, a curved closure fitting the hopper bottom and having its ends shiftably supported by the guides, an operating member movably supported by the tongue, means on the tongue cooperating with the operating member for indicating the degree of opening of the closure member, means operably connecting the operating member with the closure, an agitator in the hopper, and a means operably connecting the wheels with the agitator.

4. A spreader of the character described, comprising a hopper provided with a single discharge opening in the form of a slot, wheels to carry the hopper and an agitator in the hopper operably connected with the wheels, said agitator comprising members substantially parallel to said slot and positioned to move past said slot closely adjacent thereto and of such width as to at least partially close said slot during their passage thereover.

Signed at Los Angeles, California, this 18th day of August, 1930.

ERNEST L. HALLBERG.
HERL J. RYAN.